US009653104B2

(12) United States Patent
Litvinov et al.

(10) Patent No.: US 9,653,104 B2
(45) Date of Patent: May 16, 2017

(54) SYSTEM AND METHOD FOR SELECTIVELY REMOVING ATOMS AND USES THEREOF

(71) Applicants: Dmitri Litvinov, Friendswood, TX (US); Long Chang, Pearland, TX (US)

(72) Inventors: Dmitri Litvinov, Friendswood, TX (US); Long Chang, Pearland, TX (US)

(73) Assignee: UNIVERSITY OF HOUSTON, Houston, TX (US)

(*) Notice: Subject to any disclaimer, the term of this patent is extended or adjusted under 35 U.S.C. 154(b) by 233 days.

(21) Appl. No.: 14/083,018

(22) Filed: Nov. 18, 2013

(65) Prior Publication Data
US 2014/0144874 A1 May 29, 2014

Related U.S. Application Data

(60) Provisional application No. 61/727,280, filed on Nov. 16, 2012.

(51) Int. Cl.
C23C 14/34 (2006.01)
G11B 5/84 (2006.01)
G11B 5/855 (2006.01)

(52) U.S. Cl.
CPC ............... G11B 5/84 (2013.01); G11B 5/855 (2013.01)

(58) Field of Classification Search
CPC .................................. G11B 5/84; G11B 5/855
USPC ....... 204/192.32, 192.34; 427/523, 524, 525, 427/526, 527, 528, 529, 530, 531
See application file for complete search history.

(56) References Cited

U.S. PATENT DOCUMENTS

| 2,008,031 | A | 7/1935 | Miltner |
| 5,501,944 | A | 3/1996 | Hill et al. |
| 6,114,225 | A | 9/2000 | Liao et al. |
| 6,391,430 | B1 | 5/2002 | Fullerton et al. |
| 6,605,321 | B1 | 8/2003 | Ravelosona-Ramasitera et al. |
| 6,849,349 | B2 | 2/2005 | Klemmer et al. |
| 2010/0098873 | A1 | 4/2010 | Verhaverbeke |
| 2011/0014496 | A1* | 1/2011 | Kimura .................... C23F 4/00 428/800 |
| 2011/0104393 | A1 | 5/2011 | Kilkene et al. |
| 2012/0074399 | A1 | 3/2012 | Den Boer |
| 2012/0196155 | A1 | 8/2012 | Bencher et al. |

OTHER PUBLICATIONS

PCT International Search Report dated Mar. 28, 2014, for PCT/US201370593.

* cited by examiner

Primary Examiner — Rodney McDonald
(74) Attorney, Agent, or Firm — Winstead PC

(57) ABSTRACT

Embodiments of the present disclosure provide a method for selective removal of atoms from a substrate. Such a method comprises forming a patterned mask over at least a portion of the surface of the substrate to form a masked portion and an unmasked portion of the surface. In an embodiment, the method comprises exposing the surface to low energy light ions. In a related embodiment the low energy light ions selectively remove atoms from the unmasked portion of the substrate. In some embodiments, the method further comprises removing the mask.

In another embodiment, the present disclosure relates to a method of creating a plurality of magnetic domains on a magnetically susceptible substrate. In an embodiment, the present disclosure pertains to a method of forming a magnetic medium.

17 Claims, 3 Drawing Sheets

SYSTEM AND METHOD FOR SELECTIVELY REMOVING ATOMS AND USES THEREOF

CROSS-REFERENCE TO RELATED APPLICATIONS

This application claims priority to U.S. Provisional Application No. 61/727,280 filed Nov. 16, 2012. The entirety of the aforementioned application is incorporated herein by reference.

STATEMENT REGARDING FEDERALLY SPONSORED RESEARCH

This invention was made with government support under the National Science Foundation Grant Nos. CMMI-0927786 and ECCS-0926027. The government has certain rights in the invention.

BACKGROUND OF INVENTION

One approach for ion implantation or irradiation is to use energetic ions to remove material or reconfigure the ordering of atoms in a lattice. Since about a decade ago, the desire for new technology has fueled a renewed interest in irradiation to produce discrete track media and bit patterned media. As a result, there has been work using a variety of ions and many varieties of ion blocking layers and materials as evident from other patents. Many methods utilize high-energy ions since those are the most available ion sources. Since sources have not been designed for low energy ion irradiation, sources capable of providing low energy ion implantation are extremely limited. US Pat. Pub. No. 2010/0098873 to Verhaverbeke et al., discloses the use of lower energy ions and a masking layer to selectively render certain regions of a magnetic film to have different magnetic properties. The process discussed herein shares many of the advantages of ion irradiation, but also provide many new and important benefits.

SUMMARY OF THE INVENTION

Embodiments of the present disclosure provide a method for selective removal of atoms from a substrate. Such a method comprises forming a patterned mask over at least a portion of the surface of the substrate to form a masked portion and an unmasked portion of the surface. In an embodiment, the method comprises exposing the surface to low energy light ions. In a related embodiment the low energy light ions selectively remove atoms from the unmasked portion of the substrate. In some embodiments, the method comprises removing the mask.

In another embodiment, the present disclosure relates to a method of creating a plurality of magnetic domains on a magnetically susceptible substrate. In an embodiment, the method comprises forming a patterned mask over at least a portion of the surface of the magnetically susceptible substrate to form a masked portion and an unmasked portion of the surface. In some embodiments, the method comprises modifying the magnetic characteristics of the unmasked portion of the surface of the magnetically susceptible substrate. In an embodiment, such a method comprises exposing the surface to low energy light ions having average energy between about 1 eV to about 2 keV. In some embodiments, the method comprises removing the mask.

In an embodiment, the present disclosure pertains to a method of forming a magnetic medium. In some embodiments, the method comprises providing a magnetically susceptible substrate. In an embodiment, the method comprises forming a mask over the magnetically susceptible substrate to form a masked portion and an unmasked portion of the magnetic layer. In some embodiments, the method comprises modifying the material properties of the unmasked portion by exposing the unmasked portion to an ion beam. In an embodiment, the ions have average energy between about 1 eV to about 2 keV. In some embodiments, the method comprises removing the mask.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 3B shows the hysteresis loops measured on a Polar MagnetoOptical Kerr microscope demonstrating that irradiated CoOPd acquires perpendicular anisotropy with good film quality.

Figure 1:
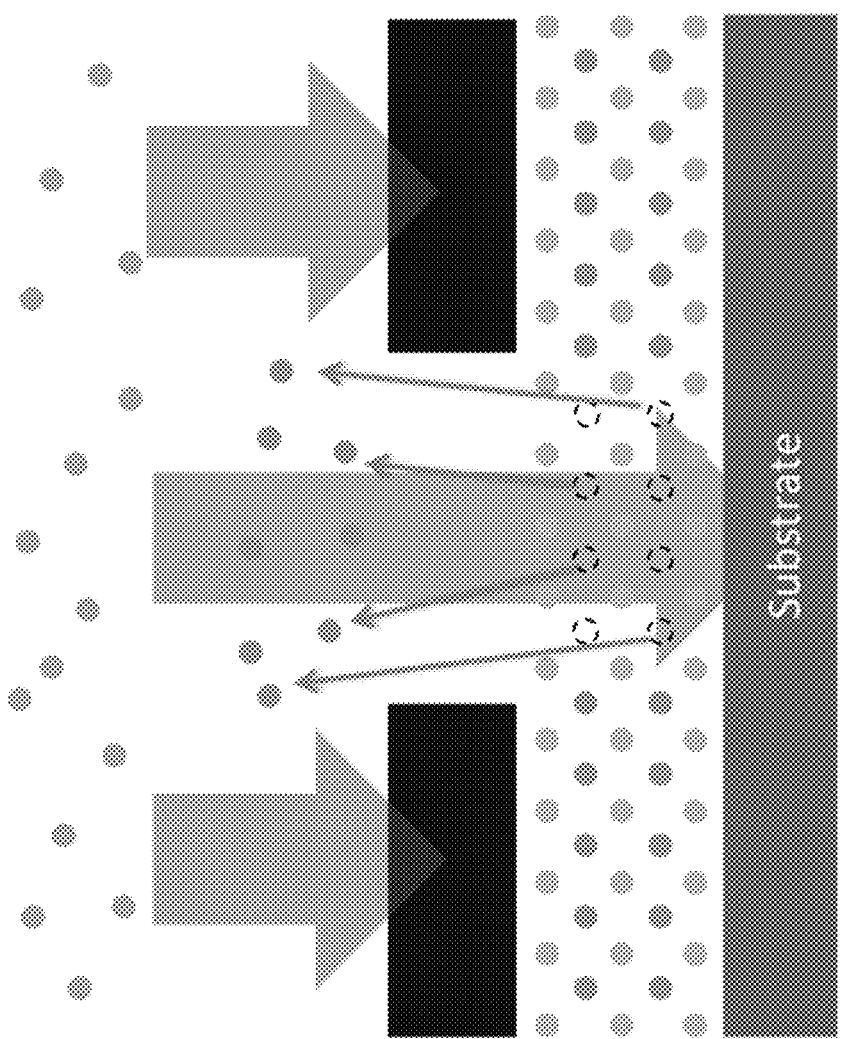
FIG. 1: Diagram portraying the process where low energy ions liberate a constituent atom of a binary material. A mask is used to selectively process specific regions/area of the material.

It is to be noted, however, that the appended drawings illustrate only typical embodiments of the present disclosure and are therefore not to be considered limiting of its scope, for the invention may admit to other equally effective embodiments.

DETAILED DESCRIPTION

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The present disclosure pertains to systems and method for selectively removing atoms from a material. In an embodiment, the present disclosure utilizes low energy light ions to locally or globally liberate certain atoms from a material resulting in a significant change in the material properties. For example, nonmagnetic $Co_3O_4$ can be transformed into magnetic Co by removing the oxygen content using helium irradiation.

The present disclosure may utilize irradiation to induce changes in the material properties of material(s) enabling the fabrication of functional devices. In irradiation, energetic atoms are fired at a target material and the collisions between the incident atoms and the target atoms result in structural changes to the material. In some embodiments, the energetic atoms may be low energy ions. For example, in some embodiments, the low energy ions may have energy equal to or greater than approximately 1 eV and equal to or less than approximately 2 keV. The ion energy level may be selected 1) to allow displacement of desired atoms, such as, but not limited to C, O, and/or N, without causing displacement of heavier elements and 2) to prevent penetration of mask material when present.

In contrast to other irradiation tactics, a nonlimiting embodiment may utilize low energy light ions. The use of low-energy light ions enables liberating specific atoms from a composite material (binary, ternary, quaternary, multilayers, super lattices), significantly changing the material properties. By using low energy ions, the displacement of heavier elements can be avoided. In a nonlimiting example, $Co_3O_4$ is a nonmagnetic material, but when irradiated with 150 eV Helium ions, the Oxygen is displaced from the lattice resulting in a material with only Co, which is ferromagnetic. Additionally, Co is a metal and $Co_3O_4$ is an oxide so the significant difference in their electrical properties can also be exploited. In another nonlimiting example, non-conducting $Cu_2O$ can be reduced to conducting Cu by irradiation with low energy ions. Since Applicants are basically changing the chemical composition of a material, it will be apparent to one of ordinary skill in the art that the possibilities for this process can be applied to various materials to change a wide variety of material properties.

In some embodiments, ion beams for irradiating materials include positively-charged ions. The positively charged ions may include, for example, positively charged hydrogen ions (e.g., protons), noble gas ions (e.g., helium, neon), boron ions, carbon ions, nitrogen ions, oxygen ions, and/or fluorine ions.

In some embodiments, beams for irradiating materials can include neutral atoms. For example, any one or more of hydrogen atoms, helium atoms, carbon atoms, nitrogen atoms, oxygen atoms, neon atoms, and fluorine atoms can be included in beams that are used for irradiation of materials. In general, mixtures of any two or more of the above types of atoms (e.g., three or more, four or more, or even more) can be present in the beams.

In certain embodiments, ion beams used to irradiate materials include singly-charged ions such as one or more of $H+$, $H''$, $He+$, $Ne+$, $Ar+$, $C+$, $C''$, $O+$, $O$, $N+$, $N''$, $Si+$, $Si''$, $P+$, $P''$, $Na+$, $Ca+$, and $Fe+$. In some embodiments, ion beams can include multiply-charged ions such as one or more of $C2+$ $C3+$, $C4+$, $N3+$, $N5+$, $N3''$, $O2+$, $O2''$, $O2\ 2''$, $Si2+$, $Si4+$, $Si2''$, and $Si4''$. In general, the ion beams can also include more complex polynuclear ions that bear multiple positive or negative charges. In certain embodiments, by virtue of the structure of the polynuclear ion, the positive or negative charges can be effectively distributed over substantially the entire structure of the ions. In some embodiments, the positive or negative charges can be somewhat localized over portions of the structure of the ions.

Nano and micro devices are fabricated by defining structures in materials or selectively altering material properties. Dry etching uses energetic atoms to essentially sandblast material to produce structures. However, the process of dry etching causes significant structural and microstructural damage. As device dimensions are scaled down to improve performance and reduce cost limitations, the limitations of such existing processes, like dry etching, are a huge impediment towards using these for fabricating nano and microdevices. The systems and methods disclosed herein overcome the aforementioned limitations and may be implemented using existing fabrication equipment for the fabrication of such devices. In an embodiment, the present disclosure pertains to a method of selective alteration of material properties. The methods and systems disclosed herein can substitute or compliment standard nano/micro fabrication processes such as dry etching. The systems and methods discussed herein utilize irradiation to induce changes in the material properties thereby enabling the fabrication of functional devices. In conventional irradiation, energetic atoms with energies greater than 2 KeV are fired at a target material and the collisions between the incident atoms and the target atoms result in structural changes to the material. As a nonlimiting example, irradiation can be used to transform a magnetic material to a less magnetic material by destroying interface anisotropy, crystal anisotropy and doping. In some embodiments, regions of material may be selectively irradiated by using a mask to protect areas that should not be processed. In an exemplary embodiment, a binary mask pattern may be used to protect/expose underlying material from the process. The systems and methods disclosed herein have a further advantage over dry etching as the mask is minimally degraded during processing. A mask can be any material that is thick and dense enough to trap/block incident atoms from reaching the underlying material. Patterning a mask with openings enables fine control of device structure. Hence, the systems and methods disclosed herein provide for a higher fidelity of patterning thereby enabling the fabrication of smaller devices with more homogenous performance.

Magnetic layers and magnetically susceptible layers are used for a number of applications in the electronics industry. In one prominent example, hard-disk drives are the storage medium of choice for computers and related devices. They are found in most desktop and laptop computers, and may also be found in a number of consumer electronic devices, such as media recorders and players, and instruments for collecting and recording data. Hard-disk drives are also deployed in arrays for network storage. Conventional approaches to creating discrete magnetic and nonmagnetic areas on a medium have focused on forming single bit magnetic domains that are completely separate from each other, either by depositing the magnetic domains as separate islands or by removing material from a continuous magnetic film to physically separate the magnetic domains. A substrate may be masked and patterned, and a magnetic material deposited over exposed portions, or the magnetic material may be deposited before masking and patterning, and then etched away in exposed portions. In either case, the topography of the substrate is altered by the residual pattern of the magnetic regions. Because the read-write head of a typical hard-disk drive may fly as close as 2 nm from the surface of the disk, these topographic alterations can become limiting. Thus, there is a need for a process or method of patterning magnetic media that has high resolution and does not alter the topography of the media, and an apparatus for performing the process or method efficiently for high volume manufacturing.

Accordingly, in an embodiment the present disclosure pertains to the use of ion irradiation to produce magnetic films with magnetic and non-magnetic regions. Ion irradiation is used to transform a region of a film from an ordered structure to a disordered structure. In one embodiment, the resultant disordered region is non-magnetic. In another embodiment, the irradiated disordered region is magnetic.

As used herein, the term "magnetic" means ferromagnetic or ferrimagnetic. The term "non-magnetic" means paramagnetic, antiferromagnetic or diamagnetic, and also includes weakly magnetic materials. The films produced in accordance with the present invention include distinct magnetic regions and non-magnetic regions.

The process uses low energy light ion irradiation to selectively change the material properties by liberating specific atoms. In some embodiments, a mask is used to protect areas that should not be processed to provide selective irradiation regions of material. The technique uses broad beam irradiation for high throughput and masks to control the processed region/area as shown in FIG. 1.

A mask can be any material that is thick and dense enough to trap/block incident atoms from reaching the underlying material. Patterning a mask with openings enables fine control of device structure. Masks are used to selectively process specific regions/areas of the substrate. The function of the mask is to prevent/minimize processing of the substrate from irradiation. Thus, openings in the mask will enable the sample material to be processed by the irradiation. The options for masks are numerous since it takes only a small amount of material to absorb or significantly reduce the energy of the incident ions. Some nonlimiting options for masks include: photosensitive materials patterned directly onto the sample, membrane masks suspended above the sample, self-assembled and directed self-assembled systems such as block-copolymers, mono-dispersed nanocrystals/nanoparticles, anodized alumina, and/or the like.

The purpose of the ions is to liberate weakly bound atoms from the lattice with minimal damage to the lattice. In some embodiments, the low energy ions may be light ions, which provide longer penetration depths and lower momentum. Longer penetration depths enable the processing of thicker material and the lower momentum enables finer control of the process. In some embodiments, the ions for this process are light species such as H and He, but B, C and N may be viable as well.

In the nonlimiting examples discussed herein, a deep reactive-ion etching (RIE) system was utilized to produce the He ions for irradiation, but any plasma source is suitable. The ion source should be capable of generating a cloud of ionized atoms and directing it towards a sample with energies in the range of 1 eV to 2 keV. The ions may or may not be neutralized on course towards the substrate. Some nonlimiting examples of suitable ion sources are: Inductively Coupled Plasma (ICP) RIE, Parallel plate RIE, or any other suitable ion source(s), Kaufman ion Sources, End Hall Ion sources, or any other suitable ion source(s).

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Many materials may be compatible with this process. The process provides a change in phase of the material induced by ion irradiation. As nonlimiting examples:
1. Transforming a nonmagnetic material to a magnetic material
   a. $Co_3O_4$ reduces to $Co_3$
   b. $CoFe_2O_4$ reduces to $CoFe$
   c. Other oxides of magnetic metals
2. Transforming a non-conducting material to a conducting material
   a. $Cu_2O$ to Cu
   b. $Al_2O_3$ to Al
   c. Other oxides of conducting metals
3. Tunable device properties
   a. TMR base resistance tuned by controlling Oxygen content in MgO tunneling barrier
   b. Magnetic properties of multilayers ($Co_3O_4$/Pd multilayer, spin-valve/spin-tunneling multilayers, etc.) can be tuned to achieve desired magnetic properties
   c. ITO (indium tin oxide), a widely used transparent oxide, has different properties depending on oxygen content
   d. Complex oxides, including superconductors, will benefit from adjustment of oxygen content
   e. The same technique could be applied to nitride materials In one embodiment, the methods and systems for selective atom removal may be utilized to fabricate bit patterned media. For example, a storage medium may be patterned to provide several individual magnetic islands.

Moreover, the systems and methods discussed herein provide a novel approach to materials engineering that enable devices to be fabricated by selective removal of some atoms from the material. As nonlimiting example of the applications the process can be applied to, an essential enabling process for fabricate integrated circuits is doping, which selectively adds atoms to modify material properties. The systems and methods discussed herein provide an alternative approach for doping materials utilized in integrated circuits. Further, the systems and methods discussed may be compatible with standard manufacturing processes.

There are many materials used in many disciplines that systems and methods discussed herein may be applied to. The following examples discussed herein are nonlimiting examples discussed for illustrative purposes. The resistance of MgO tunneling barrier in magnetic sensors/storage depends greatly on the oxygen content. The conductivity of ITO glass used in light harvesting devices is also influenced by oxygen concentration. Some superconductors such as YBCO may also benefit from oxygen adjustments. The optical properties of thin metal oxide films can be tuned by adjusting the oxygen content. As such, the low energy ion irradiation process can be applied to the aforementioned materials to eliminate, reduce and/or tune the oxygen content of certain surfaces.

The system and methods discussed herein are not limited to oxygen adjustment, but includes removal of any atom as desired. The selective removal of an atom from a material depends on its displacement energy compared to the rest of the material. Nitrogen can be removed from TaN films to adjust its performance as a seed layer for spin valve devices. The boron concentration may be adjusted to influence charge carriers in doped semiconductors. The carbon concentration in $MgCN_i$ influences its superconducting properties. This process can also be adapted to super lattice structures comprising of a combination of materials. Non-limiting examples may include a non-magnetic super lattice of $Pd/Co_3O_4$ can be irradiated to yield Pd/Co which is a magnetic material with great promise to extend the future of magnetic recording. A gradual irradiation scheme can also be adopted to produce a gradual change in the film properties. For example, a gradual change in the composition across a magnetic film can be used to produce devices with high thermal stability and low switching field. This particular material property is extremely attractive for nanomagnetic devices.

The application of the process is not limited to film materials. Phase changes can be induced in nanoparticles. One possibility is the synthesis of easy compounds like oxides and then induced a phase transformation through irradiation to produce nanoparticles of a pure element. For instance, an Fe nanoparticle can be produced by liberating oxygen from $Fe_2O_3$ particles. Additionally, the process could be used to purify a material (film or particle) by liberating lightly bound impurities.

Figure 2:
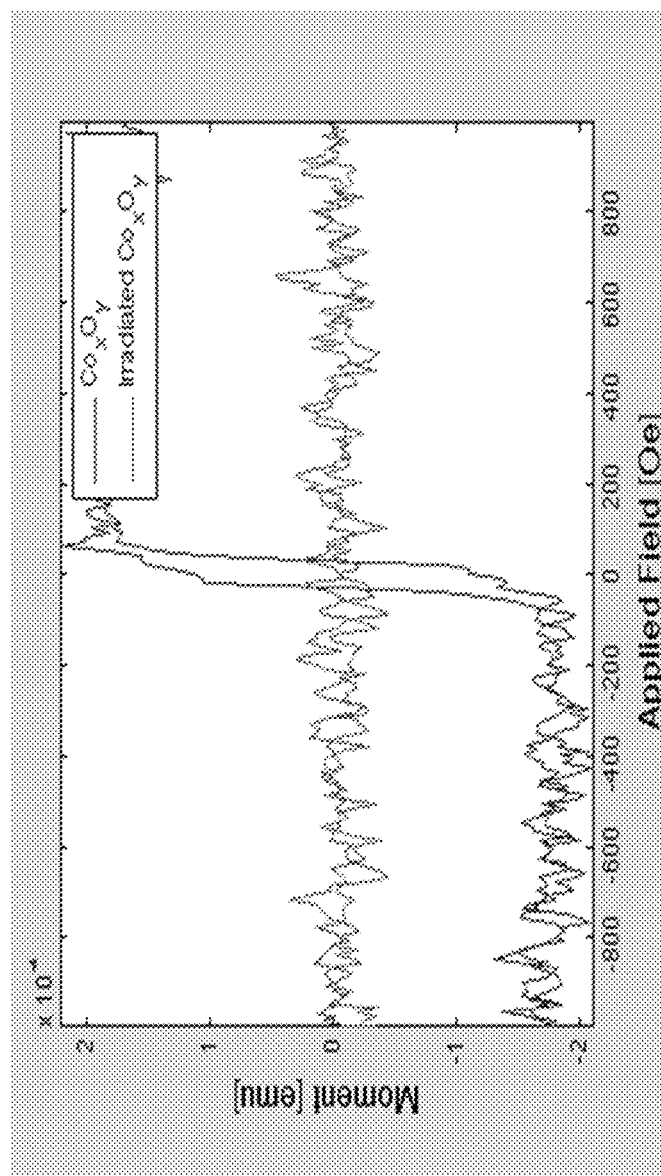
FIG. 2: Magnetic measurements show that $Co_xO_y$ is naturally nonmagnetic. Upon He irradiation, the film becomes ferromagnetic.
Figures 3A, 3B:
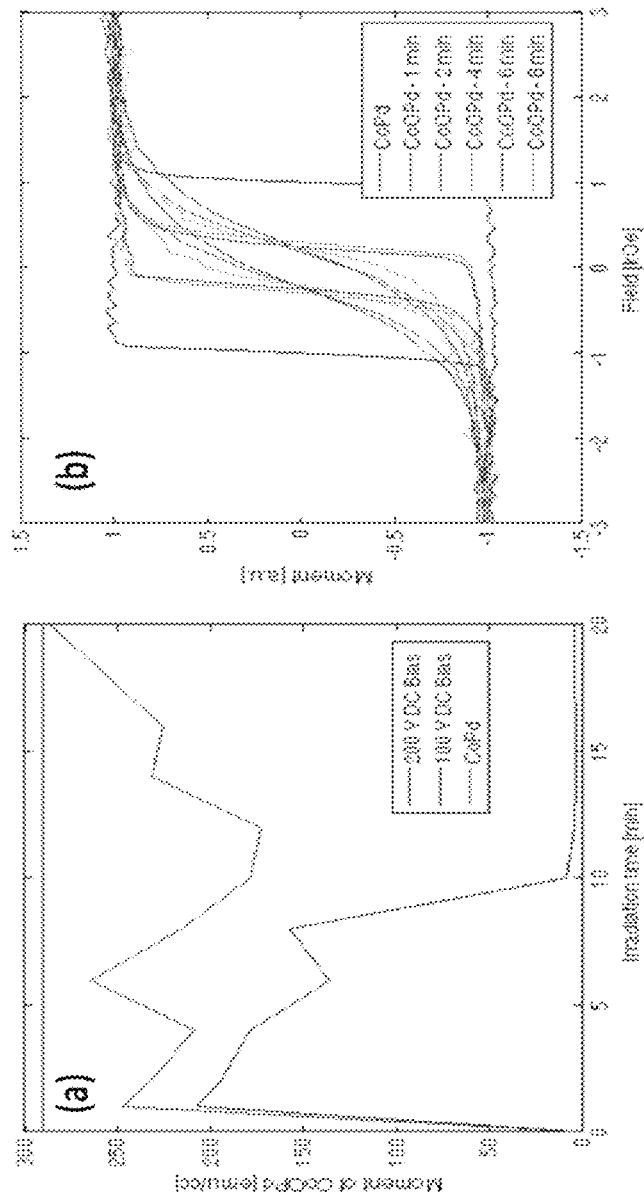
FIGS. 3A-3B show the change in magnetic moment of the material as a function of irradiation energy and irradiation time. The moment of the irradiated material approaches that of as deposited CoPd multilayers (FIG. 3A).

It has been demonstrated that the process can be performed with an ICP RIE, which is a tool utilized in nanofabrication facilities. It has been shown that a nonmagnetic $Co_xO_y$ film can be rendered magnetic in 2 minutes of irradiation, shown in FIG. 2.

Embodiments of the present disclosure may apply to, and incorporate, various types of magnetic recording media. For, example, recording media having a granular magnetic structure may be manufactured. Also, multi-layered magnetic thin films may be used. A magnetic thin film that is also a continuous magnetic film may be used with patterned media. The patterned media may be bit patterned media or track patterned media. In one embodiment, the magnetic thin film may be made of highly anisotropic magnetic material, suitable for a thermally assisted magnetic recording.

While the foregoing is directed to embodiments of the invention, other and further embodiments of the invention may be devised without departing from the basic scope thereof.

What is claimed is:

1. A method for selective removal of atoms from a substrate comprising:
    forming a patterned mask over at least a portion of a layer on the substrate to form a masked portion and an unmasked portion on the layer, wherein the layer is formed from a chemical compound that is a non-magnetic metal oxide or a non-conductive metal oxide;
    exposing the layer to low energy light ions, wherein the low energy light ions selectively remove atoms of one chemical element from the chemical compound present in the unmasked portion of the layer to cause a change in magnetic properties of the non-magnetic metal oxide or conductive properties of the non-conductive metal oxide when said exposing is complete, and the masked portion remains unchanged by said exposing step; and
    removing the mask.

2. The method of claim 1, wherein the low energy light ions have an average energy between about 1 eV to about 2 keV.

3. The method of claim 2, wherein the low energy light ions comprise one or more elements, simultaneously or in sequence, selected from the group consisting of hydrogen, helium, boron, carbon, nitrogen, oxygen, fluorine, and neon.

4. The method of claim 1, wherein the exposing step causes an increase in magnetization of the unmasked portion of the layer.

5. The method of claim 1, wherein the exposing step causes an increase in conductivity of the unmasked portion of the layer.

6. A method of creating a plurality of magnetic domains on a magnetically susceptible substrate, comprising:
    forming a patterned mask over at least a portion of a magnetically susceptible layer of the substrate to form a masked portion and an unmasked portion on the layer, wherein the magnetically susceptible substrate is initially formed from a non-magnetic chemical compound;
    modifying the magnetic characteristics of the magnetically susceptible layer to increase magnetization of the unmasked portion of the magnetically susceptible layer by exposing the layer to low energy light ions having average energy between about 1 eV to about 2 keV, wherein the low energy light ions selectively remove atoms of one chemical element from the non-magnetic chemical compound to cause the unmasked portion of the magnetically susceptible layer to become magnetic when said modifying is complete, and the masked portion remains unchanged by said exposing step; and
    removing the mask.

7. The method of claim 6, wherein the low energy light ions comprise one or more elements, simultaneously or in sequence, selected from the group consisting of hydrogen, helium, boron, carbon, nitrogen, oxygen, fluorine, and neon.

8. The method of claim 6, wherein prior to the modifying of the magnetic characteristics, the magnetically susceptible layer is an oxide of a magnetic metal.

9. The method of claim 8, wherein the oxide of the magnetic metal is $Co_3O_4$ or $CoFe_2O_4$.

10. The method of claim 6, wherein the low energy light ions comprise helium and hydrogen.

11. The method of claim 6, wherein the low energy light ions comprise helium or hydrogen.

12. A method of forming a magnetic medium, comprising:
    providing a magnetically susceptible substrate, wherein the magnetically susceptible substrate provides a magnetically susceptible layer that is initially formed from a non-magnetic chemical compound;
    forming a mask over the magnetically susceptible layer to form a masked portion and an unmasked portion of the magnetically susceptible layer;
    modifying material properties of the unmasked portion of the magnetically susceptible layer by exposing the unmasked portion to an ion beam, wherein the ions have average energy between about 1 eV to about 2 keV, wherein the ions selectively remove atoms of one chemical element from the non-magnetic chemical compound to cause the unmasked portion of the magnetically susceptible layer to become magnetic when said exposing is complete, and the masked portion remains unchanged by said exposing step; and
    removing the mask.

13. The method of claim 12, wherein the modifying of the material properties of the unmasked portion comprises increasing magnetization of the unmasked portion of the magnetically susceptible layer.

14. The method of claim 12, wherein the ion beam comprises one or more elements, simultaneously or in sequence, selected from the group consisting of hydrogen, helium, boron, carbon, nitrogen, oxygen, fluorine, and neon.

15. The method of claim 12, wherein prior to the modifying of the material properties, the magnetically susceptible layer is an oxide of a magnetic metal.

16. The method of claim 15, wherein the oxide of a magnetic metal is $Co_3O_4$ or $CoFe_2O_4$.

17. The method of claim 12, wherein the magnetic medium formed is a magnetic recording media with magnetic areas formed in the unmasked portion of the magnetically susceptible layer.

* * * * *